US008770015B2

(12) United States Patent
Ghoneim

(10) Patent No.: US 8,770,015 B2
(45) Date of Patent: Jul. 8, 2014

(54) FAULT ISOLATION IN ELECTRONIC RETURNLESS FUEL SYSTEM

(75) Inventor: Youssef A. Ghoneim, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 193 days.

(21) Appl. No.: 13/400,216

(22) Filed: Feb. 20, 2012

(65) Prior Publication Data

US 2013/0213123 A1 Aug. 22, 2013

(51) Int. Cl.
*G01M 15/05* (2006.01)

(52) U.S. Cl.
USPC .......... 73/114.41

(58) Field of Classification Search
USPC .......... 73/114.38, 114.41, 114.42, 114.43, 73/114.77
See application file for complete search history.

(56) References Cited

U.S. PATENT DOCUMENTS

| | | | | |
|---|---|---|---|---|
| 6,941,785 | B2 * | 9/2005 | Haynes et al. | 72/57 |
| 7,284,530 | B2 * | 10/2007 | Nagasaki et al. | 123/198 D |
| 2006/0090553 | A1 * | 5/2006 | Nagasaki et al. | 73/118.1 |
| 2009/0095061 | A1 * | 4/2009 | Fujino et al. | 73/114.41 |
| 2013/0112173 | A1 * | 5/2013 | Ghoneim et al. | 123/497 |

OTHER PUBLICATIONS

U.S. Appl. No. 13/069,457, not pub'd, Ghoneim.
U.S. Appl. No. 13/326,385, not pub'd, Ghoneim et al.

* cited by examiner

*Primary Examiner* — Eric S McCall

(57) ABSTRACT

A method for detecting and isolating an actual fault in a fuel delivery system having a fuel pump and a fuel pump motor, includes monitoring fuel pressure, pump current, and pump voltage. Each of a plurality of fault triggers are designated as one of flagged and un-flagged based on at least one of the fuel pressure, the pump current and the pump voltage. The actual fault in the fuel delivery system is isolated from a plurality of possible faults when a condition respective to one of the possible faults is satisfied based on at least one of the plurality of fault triggers designated as flagged and un-flagged.

20 Claims, 7 Drawing Sheets

FAULT ISOLATION IN ELECTRONIC RETURNLESS FUEL SYSTEM

TECHNICAL FIELD

This disclosure is related to fuel delivery systems.

BACKGROUND

The statements in this section merely provide background information related to the present disclosure. Accordingly, such statements are not intended to constitute an admission of prior art.

The supply of fuel to an internal combustion engine in a consistent and reliable manner is desirable. A typical vehicle fuel system includes a fuel pump which is submerged in a fuel tank. A fuel filter and a pressure regulator may be positioned on the respective intake and outlet sides of the fuel pump. Filtered fuel is thus delivered to a fuel rail, where it is ultimately injected into the engine cylinders. An Electronic Returnless Fuel System (ERFS) includes a sealed fuel tank and lacks a dedicated fuel return line. These and other features of the ERFS help to minimize vehicle emissions.

Conventional diagnostic techniques for a vehicle fuel system typically rely on knowledge of a prior fault condition. For example, a maintenance technician may determine by direct testing and/or review of a recorded diagnostic code that the fuel pump requires repair or replacement. This reactive diagnosis may not occur until vehicle performance has already been compromised. Information determined during on-board operation of the ERFS may assist in determining a root cause of such a fault.

SUMMARY

A method for detecting and isolating an actual fault in a fuel delivery system having a fuel pump and a fuel pump motor, includes monitoring fuel pressure, pump current, and pump voltage. Each of a plurality of fault triggers are designated as one of flagged and un-flagged based on at least one of the fuel pressure, the pump current and the pump voltage. The actual fault in the fuel delivery system is isolated from a plurality of possible faults when a condition respective to one of the possible faults is satisfied based on at least one of the plurality of fault triggers designated as flagged and un-flagged.

BRIEF DESCRIPTION OF THE DRAWINGS

One or more embodiments will now be described, by way of example, with reference to the accompanying drawings, in which.

DETAILED DESCRIPTION

Figure 1:
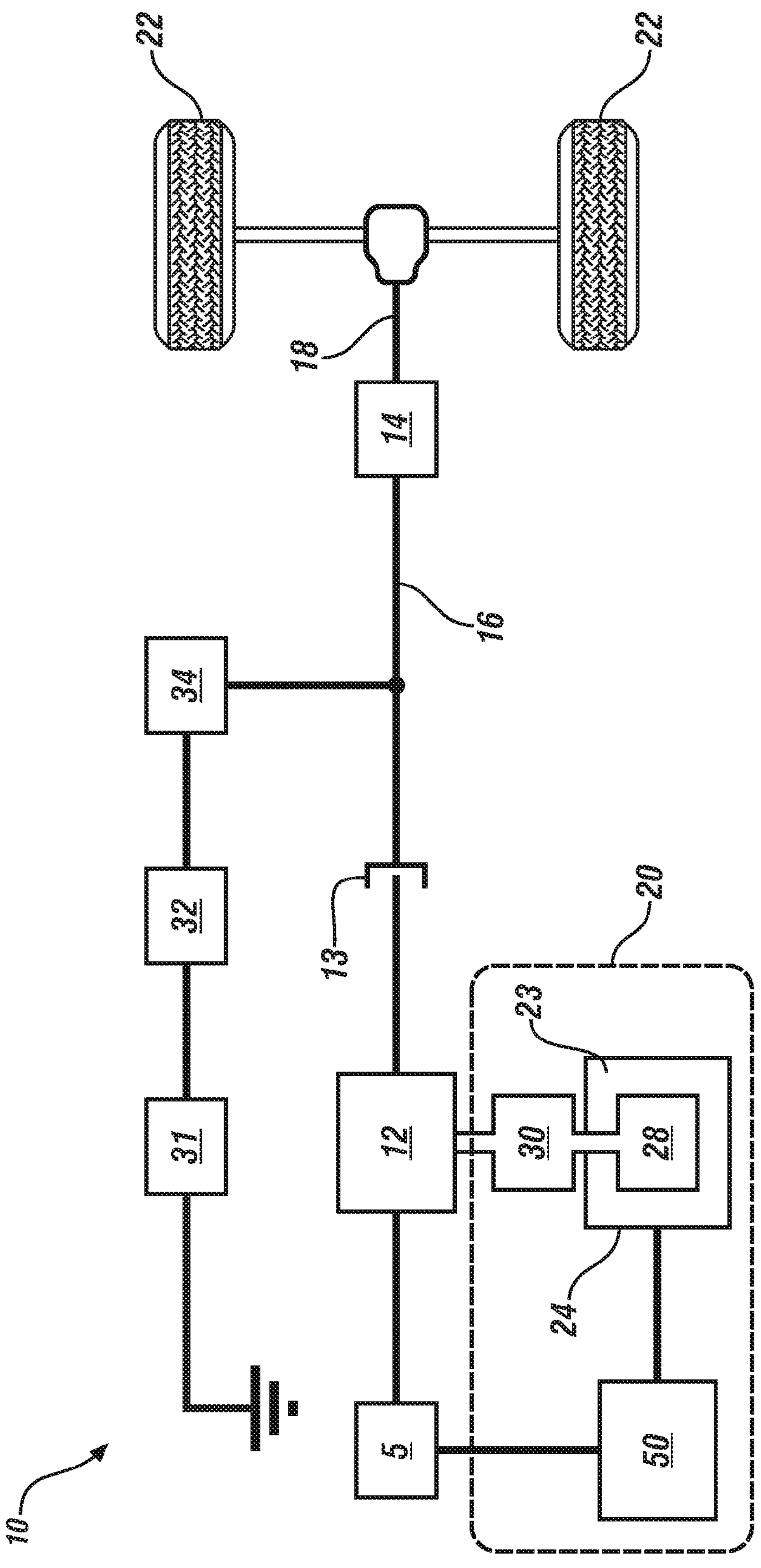
FIG. 1 schematically illustrates a vehicle including a fuel delivery system, in accordance with the present disclosure.
Figure 2:
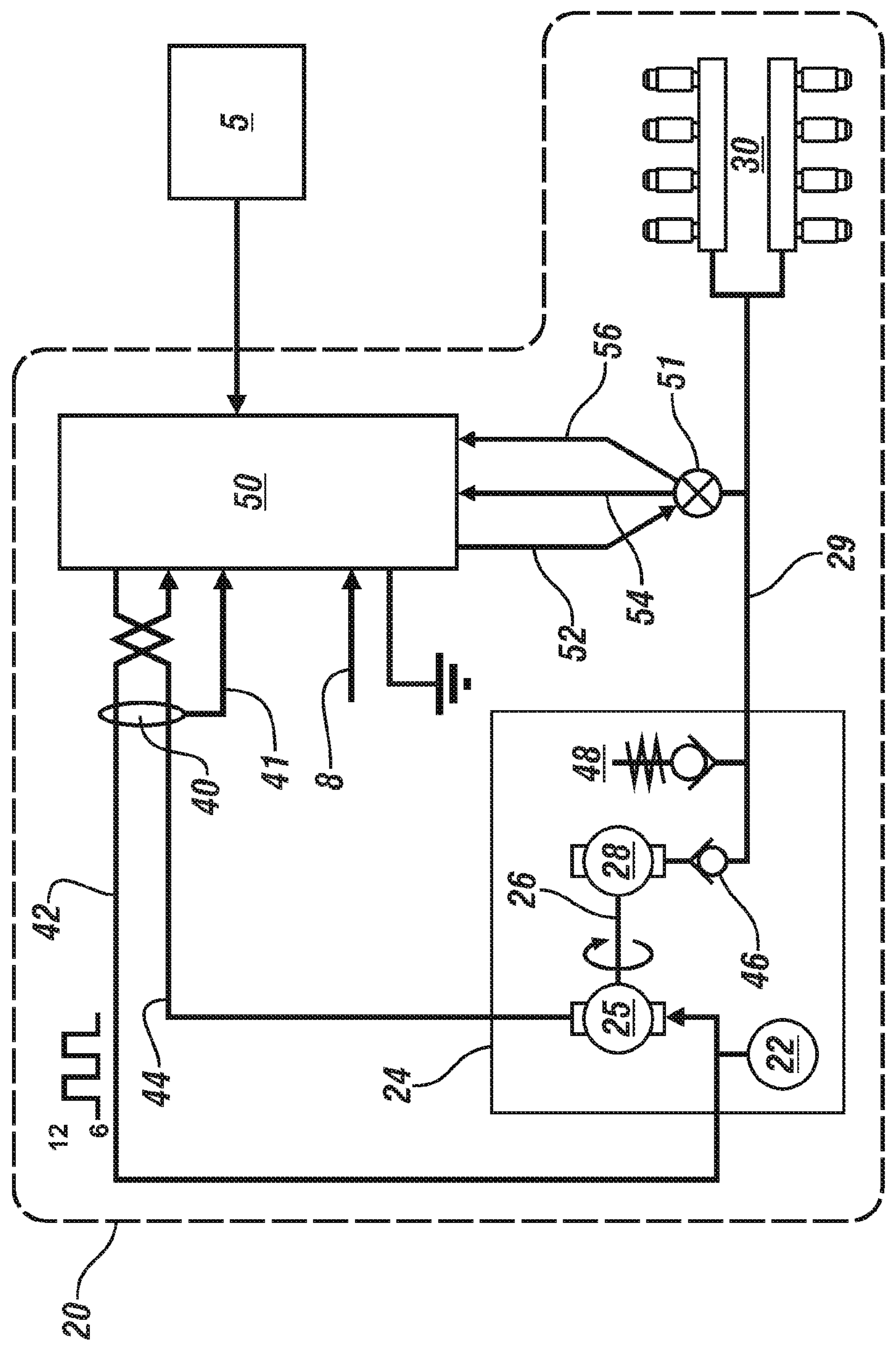
FIG. 2 schematically illustrates an electronic returnless fuel system (ERFS), in accordance with the present disclosure.

Referring now to the drawings, wherein the showings are for the purpose of illustrating certain exemplary embodiments only and not for the purpose of limiting the same, FIG. 1 schematically illustrates a vehicle 10 including a fuel delivery system 20. The fuel delivery system 20 can be an Electronic Returnless Fuel System (ERFS) that can include an ERFS controller 50. In an ERFS, a fuel tank 24 containing a supply of fuel 23 such as gasoline, ethanol, E85, or other combustible fuel is sealed relative to the surrounding environment and lacks a dedicated fuel return line. A fuel pump 28 such as a roller cell pump or gerotor pump is submerged in the fuel 23 within the fuel tank 24, and is operable for supplying fuel 23 to an internal combustion engine 12 in response to control and feedback signals from the ERFS controller 50. A fuel rail 30 is in fluid communication with fuel injectors of the internal combustion engine 12. While FIG. 1 schematically illustrates a vehicle, it will be appreciated that the fuel delivery system 20 is not limited to vehicles, and can be applied to any apparatus where fuel is to be supplied to an engine.

The vehicle 10 includes a transmission 14 having an input member 16 and an output member 18. The engine 12 may be selectively connected to the transmission 14 using an input clutch and damper assembly 13, e.g., when the vehicle 10 is a hybrid electric vehicle (HEV). The vehicle 10 may also include a DC energy storage system 31, e.g., a rechargeable battery module, which may be electrically connected to one or more high-voltage electric traction motors 34 via a traction power inverter module (TPIM) 32. A motor shaft from the electric traction motor 34 selectively drives the input member 16 when motor torque is needed. Output torque from the transmission 14 is ultimately transferred via the output member 18 to set drive wheels 22 to propel the vehicle 10.

The fuel system pressure may be referred to herein as fuel pressure 54 monitored by the ERFS controller 50 as a feedback input. The ERFS system 20 includes the ERFS controller 50, the fuel tank 24 and the fuel rail 30 for providing pressurized fuel to injectors of the engine 12. As aforementioned, the fuel pump 28 is disposed within the fuel tank 24. The pump motor 25 generates and transfers mechanical power via a rotating pump shaft 26 to the fuel pump 28 in response to a control signal 56 from the ERFS controller 50. The fuel pump 28 fluidly connects to the fuel rail 30 via the fuel line 29 to provide the pressurized fuel to injectors of the engine 10. The fuel pump 28 is operable to pump fuel 23 to the fuel rail 30 for distribution into the internal combustion engine 10 in response to the control signal 56 from the ERFS controller 50. The pump motor 25 electrically connects to the ERFS controller 50 via control line 42, with a ground path 44 returning thereto. A current sensor 22 is configured to monitor electrical current 55 supplied to the pump motor 25 via control line 42. The electrical current 55 may also be referred to herein as pump motor current or pump current, $I_s$.

The ERFS controller 50 is signally coupled to an engine control module (ECM) 5. The ERFS controller 50 operatively connects to the pump motor 25 via control line 42 and signally connects to the fuel pressure sensor 51. The ERFS controller 50 generates the control signal 56 to control the pump motor 25 to operate the fuel pump 28 to achieve and maintain a desired fuel system pressure in response to commands from the ECM 5. The ERFS controller 50 provides a reference voltage 52 to the pressure sensor 51 and monitors signal outputs from the pressure sensor 51 to determine the fuel pressure 54, $P_S$. The ERFS controller 50 monitors the electrical current 55 and the fuel pressure 54 for feedback control and diagnostics.

The ERFS controller 50 generates the control signal 56, which is a pulsewidth-modulated (PWM) signal 56 in one embodiment that is communicated via control line 42 to operate the fuel pump 28. The PWM signal 56 delivers pulsed energy to the pump motor 25, via a rectangular pulse wave. The pulse width of this wave is automatically modulated by the ERFS controller 50 resulting in a particular variation of an average value of the pulse waveform. The pulsed energy can be provided by a battery (e.g., DC energy storage system 31 of FIG. 1) and managed by the ERFS controller 50 based on a battery input 8 to the ERFS controller 50. By modulating the PWM signal 56 using the ERFS controller 50, energy flow to the pump motor 25 is regulated to control the fuel pump 28 to achieve a desired fuel system pressure for the fuel supplied to the fuel rail 30. The ERFS 20 described herein is meant to be illustrative, and other embodiments of fuel systems are within the scope of the disclosure.

The fuel tank 24 further includes a check valve 46 and a pressure vent valve (PVV) 48 disposed therein along the fuel line 29. The fuel pump 28 can be grounded via ground input 44 from the motor 25 to a grounding shield 40, whereby a ground shield input 41 is input to the ERFS controller 50.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The ERFS controller 50 controls the fuel pump 28 to achieve and/or maintain the desired fuel system pressure by applying closed-loop correction derived from the monitored fuel pressure 54 measured by the pressure sensor 51 and the monitored electrical current 55 of the pump motor 25 measured by the current sensor 22 as feedback. Further, the PWM control signal 56 is provided as feedback to and monitored by the ERFS controller 50. The PWM control signal 56 can be referred to herein as pump voltage 56.

It will be understood that the fuel pressure 54, the electrical current (i.e., pump current) 55, and the PWM control signal (i.e., pump voltage) 56 may each be referred to as monitored fuel pump operating parameters. For instance, and in an exemplary embodiment of the present disclosure, the pump current 55, the fuel pressure 54 and the pump voltage 56 may be referred to as first, second and third fuel pump parameters, respectively.

Due to the closed-loop correction of the ERFS 20, an occurrence of an actual fault generated within the ERFS 20 can result in the occurrence of at least one of a plurality of detected fault triggers, or fictitious faults within the ERFS 20, associated with the actual fault. A fault isolation controller 51 discussed below in FIG. 3 can be utilized to identify and isolate the actual fault within the ERFS 20 based on assigning the plurality of fault triggers as one of detected and undetected (e.g., flagged and un-flagged, respectively).

Figure 3:
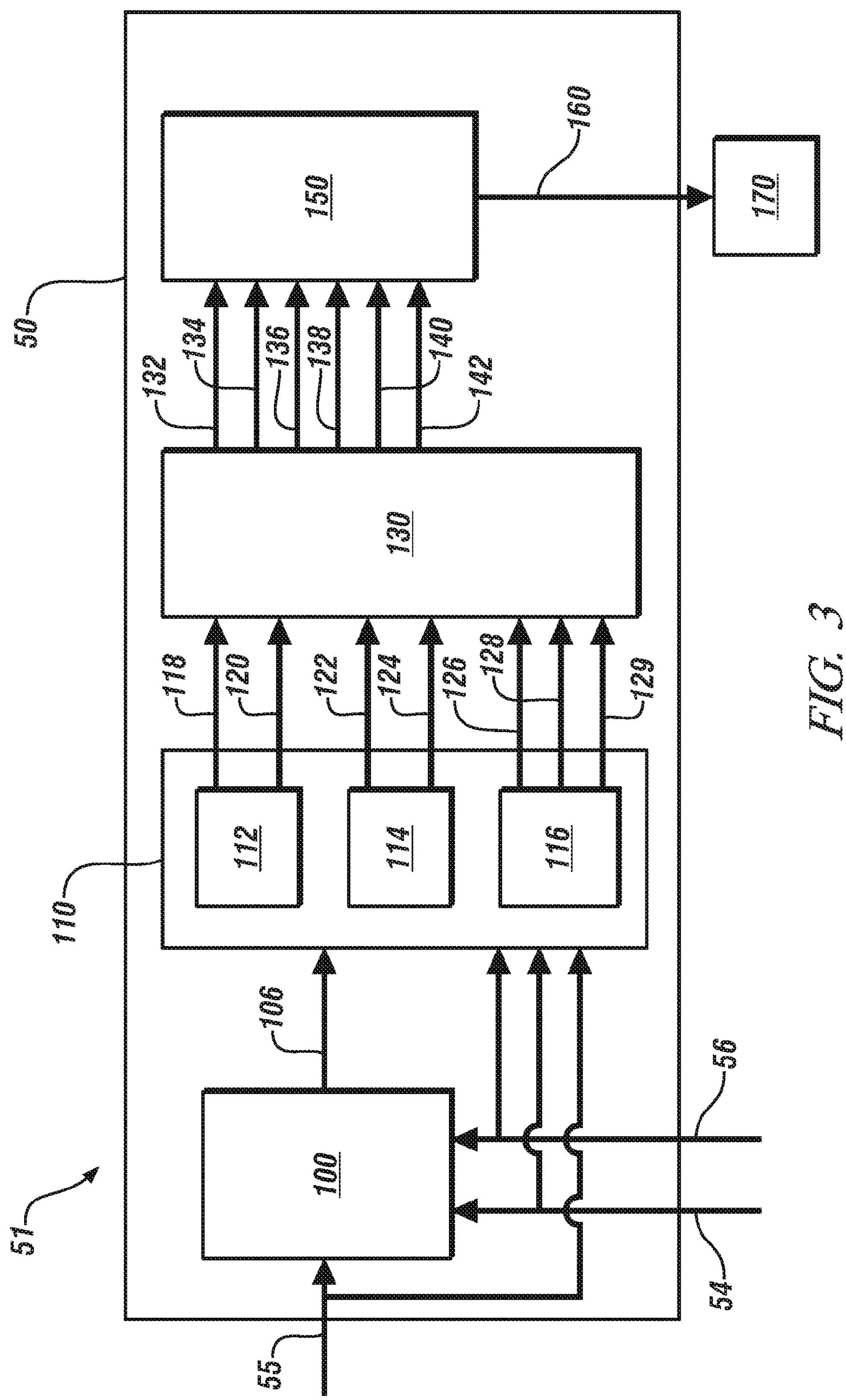
FIG. 3 schematically illustrates a fault isolation controller for detecting and isolating an actual fault in the ERFS of FIG. 2, in accordance with the present disclosure.

FIG. 3 schematically illustrates the fault isolation controller 51 that includes a diagnostic trouble code (DTC) module 170 and the ERFS controller 50 including the fault isolation block 150 for isolating an actual fault 160 within the ERFS 20 amongst a plurality of possible faults in accordance with an exemplary embodiment of the present disclosure. The actual fault amongst the plurality of possible faults can include an electrical fault, a fuel leak fault, a fuel blockage fault, a current sensor bias fault and a pressure sensor bias fault. The electrical fault can include an electrical fault in the operation of the motor 25, such as, but not limited to, brush arching, commuter/brush friction and winding faults. The fuel leak fault, in a non-limiting example, can include a leak from the fuel line 29. The fuel blockage fault can indicate blockage restriction of a filter proximate to the pump 28 and the fuel tank 24 due to dirt and other debris restricting the flow of fuel. The current sensor bias fault, when isolated as the actual fault, corresponds to a faulty current sensor 22 resulting in inaccurate readings of the pump current. The pressure sensor bias fault, when isolated as the actual fault, corresponds to a faulty pressure sensor 51 resulting in inaccurate readings of the fuel pressure.

The ERFS controller 50 includes a signal processing block 100, a parameter determination block 110, a fault triggers block 130 and the fault isolation block 150. The DTC module 170 can be utilized to decipher the actual fault 160 determined by the fault isolation block 150 during on-board operation of the vehicle. For instance, based on the actual fault 160 input to the DTC module 170, the DTC module 170 can execute a control action in response to the isolated actual fault in the fuel delivery system (e.g., ERFS) 20 such as recording the diagnostic trouble code corresponding to the isolated actual fault and/or displaying a message corresponding to the isolated actual fault. In a non-limiting example, displaying the message corresponding to the isolated actual fault can be displayed via an instrument panel, a dashboard, a Human Machine Interface (HMI) or sounding an alarm within the vehicle. The fuel pressure 54, the pump current 55 and pump voltage 56 are input to the signal processing block 100 and the parameter determination block 110. The signal processing block determines a desired fuel pressure 106 that is input to the parameter determination block 110. As aforementioned, the desired fuel pressure 106 can be in response to commands from the ECM 5 and based on at least one of the fuel pressure 54, the pump current 55 and the pump voltage 56.

The parameter determination block 110 includes an ERFS state of health (SOH) block 112, an electric parameter estimation block 114 and a sensor bias block 116. The ERFS SOH block 112 determines an ERFS SOH (i.e., fuel delivery system SOH) 118 and an estimated pump speed, $\omega_{n\_est}$ 120, based on at least one of the monitored pump parameters (e.g., fuel pressure 54, the pump motor current 55 and pump voltage 56). The electric parameter estimation block 114 determines an estimated armature resistance, $R_{a\_est}$ 122, and an estimated back-emf constant, $K_{e\_est}$ 124, for the pump motor 25 based on at least one of the monitored pump parameters. The sensor bias block determines a model of the current sensor, $I_M$ 126 (e.g., a current sensor modeled pump current), a potential pressure sensor bias, $P_{b\_flag}$ 128, and a potential current sensor bias, $I_{b\_flag}$ 129, based on at least one of the monitored pump parameters. It will be understood that if when the $P_{b\_flag}$ 128 and the $I_{b\_flag}$ 129 are detected, each sensor bias can indicate an actual or fictitious fault within the fuel delivery system 20. The SOH 118, the $\omega_{n\_est}$ 120, the $R_{a\_est}$ 122, the $K_{e\_est}$ 124, the $I_M$ 126, the $P_{b\_flag}$ 128 and the $I_{b\_flag}$ 129 determined within the parameter determination block 110 are input to the fault triggers block 130.

The ERFS SOH (i.e., fuel delivery system SOH) 118 can be determined by estimating a speed of a calibrated fuel pump and a set of nominal parameters for the calibrated fuel pump, and then calculates the estimated pump speed, $\omega_{n\_est}$ 120, of the fuel pump 28 positioned in the fuel tank 24. A deviation is calculated between the estimated speeds of the calibrated fuel pump and the fuel pump 28 and a progress of the deviation is determined over a calibrated interval where the ERFS SOH (i.e., fuel delivery system SOH) 118 is calculated using the progress of deviation. As a result, the ERFS SOH 118 provides a relative measure of the SOH of the fuel delivery system at a given time point. The nominal parameters can include a validated expected baseline level of performance, and may include motor armature resistance, a counter or back electromotive force (back-emf) and a motor inductance. The estimated pump speed, $\omega_{n\_est}$ 120, of the actual fuel pump 28 can be calculated based on at least one of the pump voltage, pump current and fuel pressure.

The estimated armature resistance, $R_{a\_est}$ 122, and the estimated back-emf constant, $K_{e\_est}$ 124, for the pump motor 25 can be determined utilizing a two-stage estimation model. During a first stage, it is assumed that back-emf constant $K_e$ is known, i.e., the back-emf constant $K_e$ has a nominal value. The armature resistance can be estimated using a least-square estimation with a forgetting factor. The first stage includes defining a regression model as follows:

$$y_1(t)=\phi_1(t)^*\theta_1$$

$$y_1(t)=V_m(t)-K_e^*\omega_m,\ \phi_1(t)=I,\text{ and }\theta_1=R_a \qquad [1]$$

wherein $K_e$ is the nominal back-emf constant, and $R_a$ is the armature resistance, which is estimated as $R_{a\_est}$ employing EQ. [3] below.

During the second stage, the estimated armature resistance determined from the first stage is used and the following regression model is defined as follows:

$$y_2(t)=\phi_2(t)^*\theta_2$$

$$y_2(t)=V_m(t)-I^*\hat{R}_a(t),\ \phi_2(t)=\omega_m,\theta_2=K_e \qquad [2]$$

wherein $R_{a\_est}$ is the estimated armature resistance determined from the first stage, as described with reference to EQ. [3].

The two-stage estimation model including the least-square estimation with the forgetting factor is executed in accordance with i=1, 2, wherein i is the stage number, i.e., one of the first stage and the second stage. This is depicted in the following relationships:

$$\hat{\theta}_i(t)=\hat{\theta}_i(t-1)+\frac{P_i(t-2)\varphi_i(t-1)}{\lambda_i(t-1)+\varphi_i^2(t-1)P_i(t-2)}\varepsilon_i(t) \qquad [3]$$

$$P_i(t-1)=\frac{1}{\lambda_i(t-1)}\left[P_i(t-2)-\frac{P_i(t-2)^2\varphi_i(t-1)^2}{\lambda_i(t-1)+\varphi_i^2(t-1)P_i(t-2)}\right]$$

$$\lambda_i(t)=1-\lambda_0\frac{\varepsilon_i^2(t)}{1+\varphi_i^2(t-1)P_i(t-2)}$$

wherein $$\epsilon_1=y_1(t)-I\hat{R}_a(t)$$

$$\epsilon_2=y_2(t)-\omega_m\hat{K}_e(t).$$

A first error term $\epsilon_1$ is associated with an error in the armature resistance and a second error term $\epsilon_2$ is associated with an error in the back-emf constant. The term $\lambda_i$ is a data-dependent weighting factor, and Pi is interpreted as a covariance of the selected parameter having a magnitude that provides a measure of the uncertainty of the parameter values. In the case of a change in motor resistance or back-emf constant from original values $\epsilon_i$ increases. This temporarily reduces $\lambda_i$ but increases $P_i$ quickly, thus permitting a rapid adaptation to the changes in the motor parameters.

The two-stage estimation model shown in EQ. [3] is translated to an algorithm that is periodically executed to determine $\hat{\theta}_i(t)$, with $\hat{\theta}_1(t)=\hat{R}_a(t)$ and $\hat{\theta}_2(t)=\hat{K}_e$ (t). $\hat{R}_a$ (t) corresponds to $R_{a\_est}$ 122 and $K_e(t)$ corresponds to $K_{e\_est}$ 124. The two-stage estimation model is employed for motor parameter estimation having varying parameter states due to occurrence of a fault or degradation. The use of the forgetting factors allows continuous tracking of time-varying parameters. Execution of the two-stage estimation model using least-square estimation with forgetting factors as described herein results in motor parameters of interest including the estimated armature resistance, $R_{a\_est}$ 122, i.e., $\hat{R}_a=\hat{\theta}_1$ and the estimated back-emf constant, $K_{e\_est}$ 124, i.e., $\hat{K}_e=\hat{\theta}_2$.

The fault triggers block 130 can be utilized to designate each of a plurality of fault triggers as one of flagged and un-flagged based on at least one of the monitored fuel pump parameters. The designated plurality of fault triggers designated as flagged and un-flagged can include a SOH fault trigger, $SOH_{f\_trig\_flag}$ 132, a pressure sensor bias fault trigger, $P_{f\_trig\_flag}$ 134, a fuel blockage fault trigger, $Fblock_{f\_trig\_flag}$ 136, a pressure ratio fault trigger, $P_{ratio\_trig\_flag}$ 138, a pump speed fault trigger, $\omega_{nf\_trig\_flag}$ 140 and an electric fault trigger, $E_{f\_trig\_flag}$ 142. It will be appreciated that a designated flagged fault trigger indicates a fault is detected and a designated un-flagged fault trigger indicates that a fault is not detected. In other words, each of the plurality of fault triggers can be assigned as one of detected and un-detected in the fault triggers block 130 based on the monitored fuel pump operating parameters.

Figure 4:
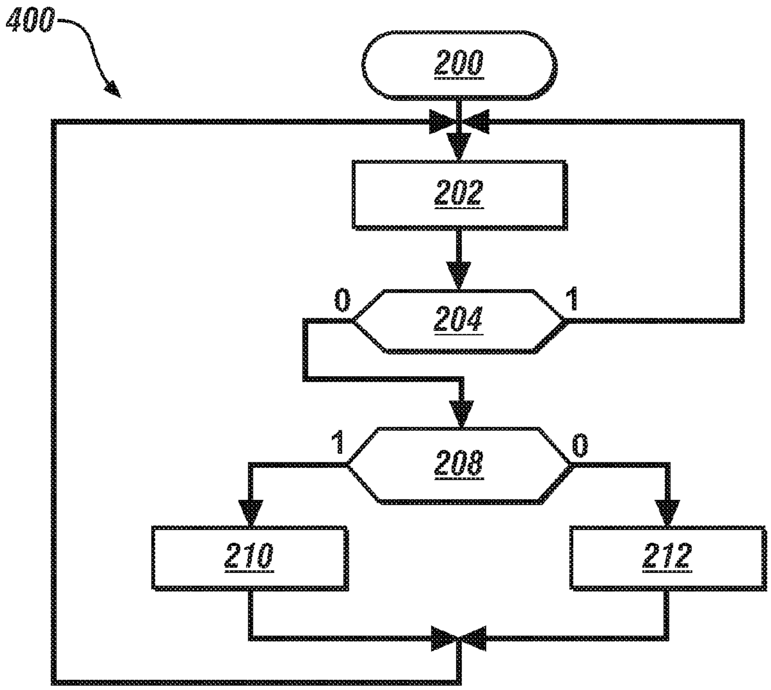
FIGS. 4-9 illustrate flowcharts for designating fault triggers as one of flagged and un-flagged, in accordance with the present disclosure.

Referring to FIG. 4, a flowchart 400 is illustrated to assign the SOH fault trigger, $SOH_{f\_trig\_flag}$ 132, as one of detected (e.g., flagged) and un-detected (e.g., un-flagged) in accordance with an exemplary embodiment of the present disclosure. Table 1 is provided as a key to FIG. 4 wherein the numerically labeled blocks and the corresponding functions for the flowchart 400 are set forth as follows.

TABLE 1

| BLOCK | BLOCK CONTENTS |
|---|---|
| 200 | Start |
| 202 | Input: ERFS SOH 118 |
| 204 | Is ERFS SOH 118 > SOH_hi? |
| 208 | Is pump SOH 118 < SOH_low? |
| 210 | Set $SOH_{f\_trig\_flag}$ = 1 |
| 212 | Set $SOH_{f\_trig\_flag}$ = 0 |

The flowchart 400 starts at block 200. The monitored ERFS SOH 118 is input at block 202 and utilized in decision block 204. Decision block 204 compares the ERFS SOH 118 to a SOH high threshold, SOH_hi. A "1" indicates the ERFS SOH 118 is greater than the SOH_hi, and the flowchart reverts back to block 202 because the ERFS 20 is deemed healthy and a fault trigger is thereby not detected (i.e., $SOH_{f\_trig\_flag}$=0, thereby designating the $SOH_{f\_trig\_flag}$ as un-flagged and assigning an un-detected $SOH_{f\_trig\_flag}$). A "0" indicates the ERFS SOH 118 is not greater than the SOH_hi, and the flowchart proceeds to decision block 208. Decision block 208 compares the ERFS SOH 118 to a SOH low threshold, SOH_low. A "1" indicates the SOH is less than the SOH_low, and the flowchart proceeds to block 210. A "0" indicates the SOH is not less than the SOH_low, and the flowchart proceeds to block 212. Block 210 sets the $SOH_{f\_trig\_flag}=1$, thereby designating the $SOH_{f\_trig\_flag}$ as flagged and assigning a detected $SOH_{f\_trig\_flag}$. Block 212 sets the $SOH_{f\_trig\_flag}=0$, thereby designating the $SOH_{f\_trig\_flag}$ as un-flagged and assigning an un-detected $SOH_{f\_trig\_flag}$. In other words, a detected fuel system SOH fault trigger ($SOH_{f\_trig\_flag}=1$) is assigned when the fuel system SOH is less than the low SOH threshold. An un-detected fuel system SOH fault trigger ($SOH_{f\_trig\_flag}=0$) is assigned when the fuel system SOH is at least the low state of health threshold. It will be appreciated that $SOH_{f\_trig\_flag}=0$ or $SOH_{f\_trig\_flag}=1$ corresponds to the SOH fault trigger, $SOH_{f\_trig\_flag}$ 132, output from the fault triggers box 130 and input to the fault isolation box 150.

Figure 5:
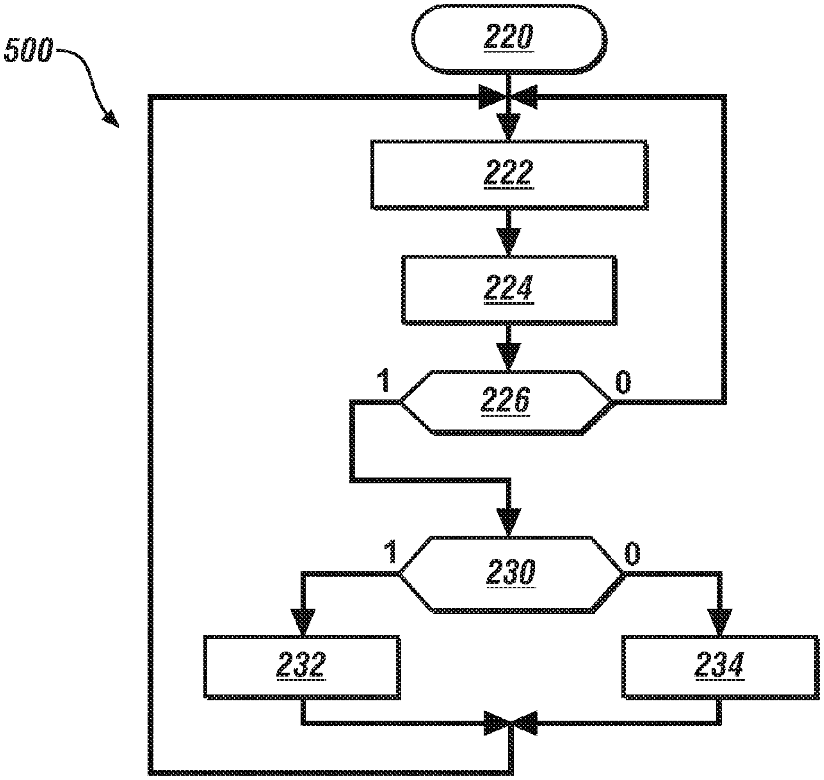

Referring to FIG. 5, a flowchart 500 is illustrated to assign the pressure sensor bias fault trigger flag, $P_{f\_trig\_flag}$ 134, as one of detected (e.g., flagged) and un-detected (e.g., un-flagged) in accordance with an exemplary embodiment of the present disclosure. Table 2 is provided as a key to FIG. 5 wherein the numerically labeled blocks and the corresponding functions for the flowchart 500 are set forth as follows.

TABLE 2

| BLOCK | BLOCK CONTENTS |
|---|---|
| 220 | Start |
| 222 | Inputs: $P_s$, $P_{des}$, $I_M$, $I_s$, $R_{a\_est}$ |
| 224 | $P_r = P_s/P_{des}$<br>$I_r = I_s/I_M$ |
| 226 | Is $P_r \le P_{r\_low}$ &<br>$R_{a\_est} \le R_{a\_Th}$ &<br>$I_r \ge I_{r\_max}$ ? |
| 230 | Is $P_r > P_{r\_min}$ ? |
| 232 | Set $P_{f\_trig\_flag} = 0$ |
| 234 | Set $P_{f\_trig\_flag} = 1$ |

The flowchart 500 starts at block 220 and proceeds to block 222 where monitored parameters $P_s$, $P_{des}$, $I_M$, $I_s$ and $R_{a\_est}$ are input at block 222. A pressure ratio, $P_r$, and a current ratio, $I_r$, are determined as follows in block 224 before proceeding to decision block 226.

$$P_r = P_s/P_{des} \quad [4]$$

$$I_r = I_s/I_M \quad [5]$$

Decision block 226 compares the Pr, Ra_est and $I_r$ to respective thresholds to determine if a condition is satisfied as follows.

$$Pr \le P_{r\_low} \;\&$$

$$R_{a\_est} \le R_{a\_Th} \;\&$$

$$I_r \ge I_{r\_max}$$

wherein $P_{r\_low}$ is a low pressure ratio threshold, $R_{a\_Th}$ is a motor armature resistance threshold, and $I_{r\_max}$ is a maximum current ratio threshold.

A "1" indicates the first condition is satisfied when all of the comparisons are met and the flowchart 500 proceeds to decision block 230. A "0" indicates the first condition is not satisfied because at least one of the comparisons is not met and the flowchart 500 reverts back to block 222. When the first condition is not satisfied, $P_{f\_trig\_flag}=0$, thereby designating the $P_{f\_trig\_flag}$ as un-flagged and assigning an un-detected $P_{f\_trig\_flag}$.

When the pressure ratio is not greater than the low pressure ratio threshold, the estimated motor armature resistance is not greater than the motor armature resistance threshold and the current ratio is at least the maximum current ratio threshold (i.e., decision block 226), decision block 230 compares the pressure ratio, $P_r$, to a minimum pressure ratio threshold, $P_{r\_min}$. A "1" indicates that $P_r$ is greater than $P_{r\_min}$ and proceeds to block 232. A "0" indicates that $P_r$ is not greater than $P_{r\_min}$ and proceeds to block 234. Block 232 sets the $P_{f\_trig\_flag}=0$, thereby designating the $P_{f\_trig\_flag}$ as un-flagged and assigning an un-detected $P_{f\_trig\_flag}$. Block 234 sets the $P_{f\_trig\_flag}=1$, thereby designating the $P_{f\_trig\_flag}$ as flagged and assigning a detected $P_{f\_trig\_flag}$. In other words, a detected pressure sensor bias fault trigger ($P_{f\_trig\_flag}=1$) is assigned when the pressure ratio is not greater than the minimum pressure ratio threshold. An un-detected pressure sensor bias fault trigger ($P_{f\_trig\_flag}=0$) is assigned when the pressure ratio is greater than the minimum pressure ratio threshold. It will be appreciated that setting $P_{f\_trig\_flag}=1$ or $P_{f\_trig\_flag}=0$ corresponds to the pressure sensor bias fault trigger, $P_{f\_trig\_flag}$ 134, output from the fault triggers box 130 and input to the fault isolation box 150.

Figure 6:
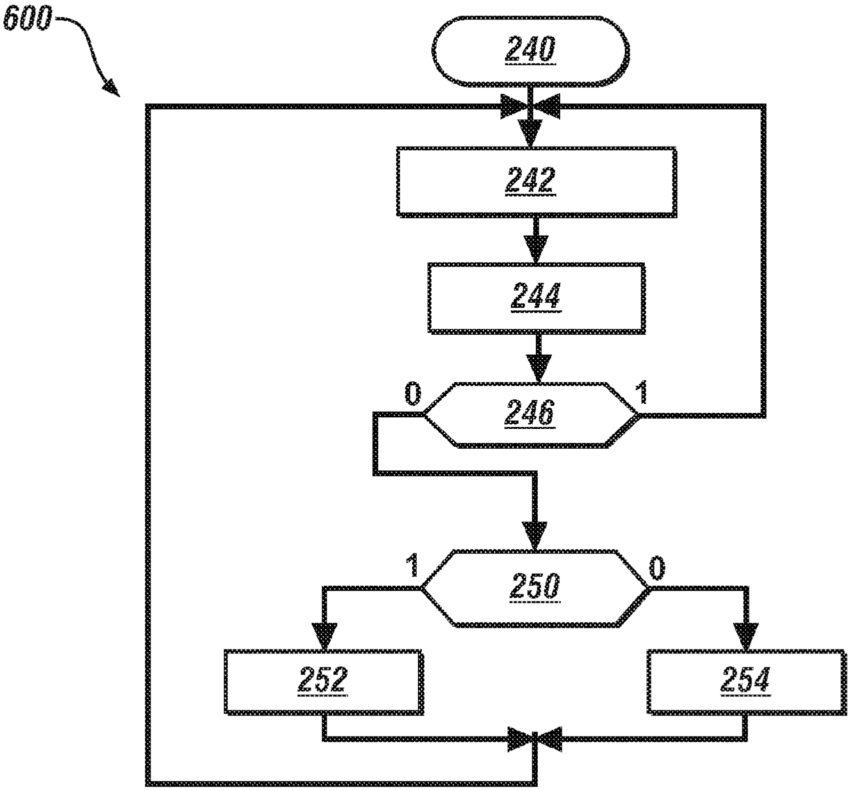

Referring to FIG. 6, a flowchart 600 is illustrated to assign the pressure ratio fault trigger flag, $P_{ratio\_trig\_flag}$ 138, as one of detected (e.g., flagged) and un-detected (e.g., un-flagged) in accordance with an exemplary embodiment of the present disclosure. Table 3 is provided as a key to FIG. 6 wherein the numerically labeled blocks and the corresponding functions for the flowchart 600 are set forth as follows.

TABLE 3

| BLOCK | BLOCK CONTENTS |
|---|---|
| 240 | Start |
| 242 | Inputs: $P_s$, $P_{des}$ |
| 244 | $P_r = P_s/P_{des}$ |
| 246 | Is $P_r > P_{r\_low}$ ? |
| 250 | Is $P_r < P_{r\_min}$ ? |
| 252 | Set $P_{ratio\_trig\_flag} = 1$ |
| 254 | Set $P_{ratio\_trig\_flag} = 0$ |

The flowchart 600 starts at block 240 and proceeds to block 242 where $P_s$ and $P_{des}$ are input at block 242. The pressure ratio, $P_r$, is determined utilizing EQ. [4] in block 244 and monitored before proceeding to decision block 246. Decision block 246 compares the $P_r$ to the low pressure ratio threshold, $P_{r\_low}$. A "1" indicates that $P_r$ is greater than the $P_{r\_low}$, and reverts back to block 242 and sets the $P_{ratio\_trig\_flag}=0$, thereby designating $P_{ratio\_trig\_flag}$ as un-flagged and assigning an un-detected $P_{ratio\_trig\_flag}$. A "0" indicates that $P_r$ is not greater than the $P_{r\_low}$ and the flowchart proceeds to decision block 250.

When the $P_r$ is not greater than the $P_{r\_low}$ decision block 250 compares the pressure ratio, $P_r$, to the minimum pressure ratio threshold, $P_{r\_min}$. A "1" indicates that $P_r$ is less than $P_{r\_min}$ and proceeds to block 252. A "0" indicates that $P_r$ is not less than $P_{r\_min}$ and proceeds to block 254. Block 252 sets the $P_{ratio\_trig\_flag}=1$, thereby designating $P_{ratio\_trig\_flag}$ as flagged and assigning a detected $P_{ratio\_trig\_flag}$. Block 254 sets the $P_{ratio\_trig\_flag}=0$, thereby designating $P_{ratio\_trig\_flag}$ as un-flagged and assigning an un-detected $P_{ratio\_trig\_flag}$. In other words, a detected pressure ratio fault trigger ($P_{ratio\_trig\_flag}=1$) is assigned when the pressure ratio is less than the minimum pressure ratio threshold. An un-detected pressure ratio fault trigger ($P_{ratio\_trig\_flag}$=0) is assigned when the pressure ratio is at least the minimum pressure ratio threshold). It will be appreciated that setting $P_{ratio\_trig\_flag}$=1 or $P_{ratio\_trig\_flag}$=0 corresponds to the pressure ratio fault trigger flag, $P_{ratio\_trig\_flag}$ 138, output from the fault triggers box 130 and input to the fault isolation box 150.

Figure 8:
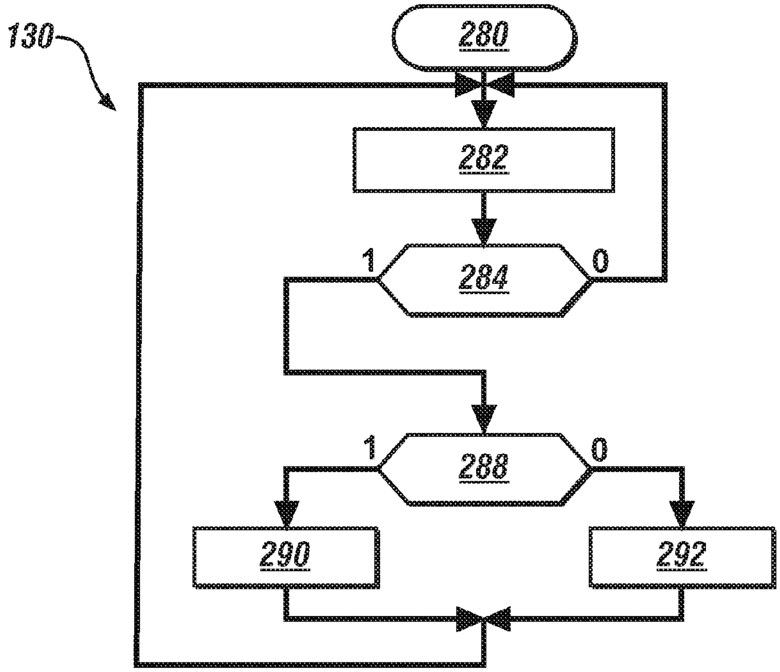

Referring to FIG. 8, a flowchart 800 is illustrated to assign the pump speed fault trigger flag, $\omega_{nf\_trig\_flag}$ 140, as one of detected (e.g., flagged) and un-detected (e.g., un-flagged) in accordance with an exemplary embodiment of the present disclosure. Table 4 is provided as a key to FIG. 8 wherein the numerically labeled blocks and the corresponding functions for the flowchart 900 are set forth as follows.

TABLE 4

| BLOCK | BLOCK CONTENTS |
|---|---|
| 280 | Start |
| 282 | Inputs: $P_s$, $\omega_{n\_est}$ |
| 284 | Is $P_s \le P_{s\_low}$ & $\omega_{n\_est} > \omega_{n\_HI}$ ? |
| 288 | Is $P_s > P_{s\_TH}$ or $\omega_{n\_est} < \omega_{n\_TH1}$ ? |
| 290 | Set $\omega_{nf\_trig\_flag} = 0$ |
| 292 | Set $\omega_{nf\_trig\_flag} = 1$ |

The flowchart 800 starts at block 280 and proceeds to block 282 where $P_s$ and $\omega_{n\_est}$ are input at block 282, and then the flowchart 800 proceeds to decision block 284. Decision block 284 compares the $P_s$ to a low pressure sensor threshold (e.g., first fuel pressure threshold), $P_{s\_low}$ and the $\omega_{n\_est}$ to a high pump speed threshold (e.g., first pump speed threshold), $\omega_{n\_HI}$. A "1" indicates that both the $P_s$ is less than the $P_{s\_low}$ and the $\omega_{n\_est}$ is at least the $\omega_{n\_HI}$, where the flowchart 800 proceeds to decision block 288. A "0" indicates that either one of the $P_s$ is at least the $P_{s\_low}$ or the $\omega_{n\_est}$ is less than the $\omega_{n\_HI}$, where the flowchart 800 reverts back to block 282. When either one of the $P_s$ is at least the $P_{s\_low}$ or the $\omega_{n\_est}$, is less than the $\omega_{n\_HI}$, the $\omega_{nf\_trig\_flag}$=0, thereby designating the $\omega_{nf\_trig\_flag}$ as un-flagged and assigning an un-detected $\omega_{nf\_trig\_flag}$.

When both the $P_s$ is less than the $P_{s\_low}$ and the $\omega_{n\_est}$ is at least the $\omega_{n\_HI}$, decision block 288 compares the $P_s$ to a second pressure sensor threshold, $P_{s\_TH}$, and the $\omega_{n\_est}$ to a second pump speed threshold, $\omega_{n\_TH1}$. A "0" indicates that anyone of the $P_s$ is not greater than the $P_{s\_HI}$ and the $\omega_{n\_est}$ is at least than the $\omega_{n\_TH1}$, and the flowchart 800 proceeds to block 292. A "1" indicates that both the $P_s$ is greater than the $P_{s\_HI}$ and the $\omega_{n\_est}$ is less than the $\omega_{n\_TH1}$, and the flowchart 800 proceeds to block 290. Block 290 sets the $\omega_{nf\_trig\_flag}$=0, thereby designating the $\omega_{nf\_trig\_flag}$ as un-flagged and assigning an un-detected $\omega_{nf\_trig\_flag}$. Block 292 sets the $\omega_{nf\_trig\_flag}$=1, thereby designating the $\omega_{nf\_trig\_flag}$ as flagged and assigning a detected $\omega_{nf\_trig\_flag}$. In other words, a detected pump speed fault trigger ($\omega_{nf\_trig\_flag}$=1) is assigned when any one of the fuel pressure is not greater than the second fuel pressure threshold and the estimated pump speed is at least the second pump speed threshold. An un-detected pump speed ($\omega_{nf\_trig\_flag}$=0) is assigned when both the fuel pressure is greater than the second fuel pressure threshold and the estimated pump speed is less than the second pump speed threshold. It will be appreciated that $\omega_{nf\_trig\_flag}$=1 or $\omega_{nf\_trig\_flag}$=0 corresponds to the pump speed fault trigger, $\omega_{nf\_trig\_flag}$ 140, output from the fault triggers box 130 and input to the fault isolation box 150.

Figure 9:
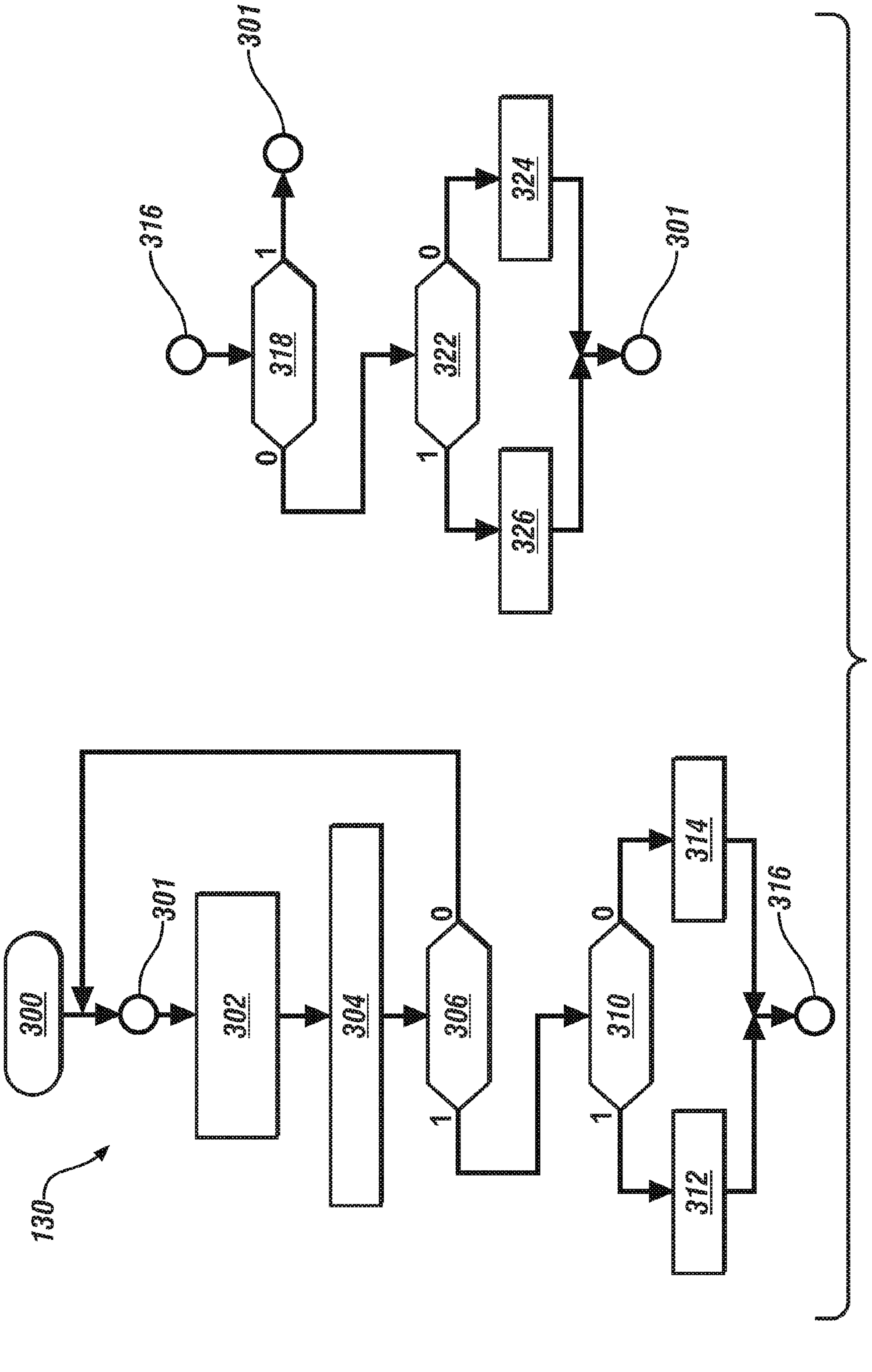

Referring to FIG. 9, a flowchart 900 is illustrated to assign the electric fault trigger, $E_{f\_trig\_flag}$ 142, as one of detected (e.g., flagged) and un-detected (e.g., un-flagged) in accordance with an exemplary embodiment of the present disclosure. Table 5 is provided as a key to FIG. 9 wherein the numerically labeled blocks and the corresponding functions for the flowchart 900 are set forth as follows.

TABLE 5

| BLOCK | BLOCK CONTENTS |
|---|---|
| 300 | Start |
| 301 | First starting point A |
| 302 | Inputs: $R_{a\_est}$, $R_{a\_nom}$, $K_{e\_est}$, $K_{e\_nom}$, $P_{f\_trig\_flag}$, $SOH_{f\_trig\_flag}$, $I_r$ |
| 304 | $R_{a_{err}} = \left\| \frac{R_{a\_est} - R_{a\_nom}}{R_{a\_nom}} \right\|$ $K_{e\_err} = \left\| \frac{K_{e\_est} - K_{e\_nom}}{K_{e\_nom}} \right\|$ |
| 306 | Is $R_{a\_err}$, or $K_{e\_err} \ge K_{p\_err1}$? |
| 310 | Is $R_{a\_err}$, & $K_{e\_err} < K_{p\_err2}$? |
| 312 | Set $flag_1 = 1$ |
| 314 | Set flag1 = 0 |
| 316 | Second starting point B |
| 318 | Is $P_{f\_trig\_flag} = 0$ & $SOH_{f\_trig\_flag} = 0$ & $flag_1 = 0$, or $I_r \le I_{th2}$ & $SOH_{f\_trig\_flag} = 0$? |
| 322 | Is $I_r > I_{th2}$ & $SOH_{f\_trig\_flag} = 1$, or $SOH_{f\_trig\_flag} = 1$ & $flag_1 = 1$? |
| 324 | Set $E_{f\_trig\_flag} = 0$ |
| 326 | Set $E_{f\_trig\_flag} = 1$ |

The flowchart 900 starts at block 300 and proceeds to first starting point A 301 and then to block 302. In block 302, $R_{a\_est}$, $R_{a\_nom}$, $K_{e\_est}$, $K_{e\_nom}$, $P_{f\_trig\_flag}$ (i.e., see FIG. 5), $SOH_{f\_trig\_flag}$ (i.e., see FIG. 4) and $I_r$ are input before proceeding to block 304, wherein $R_{a\_nom}$ is a nominal motor armature resistance, $K_{e\_nom}$ is a nominal motor back EMF constant, and $I_r$ is the current ratio.

Block 304 determines a motor armature resistance error, $R_{a\_err}$, and a motor back-emf constant error, $K_{e\_err}$ as follows.

$$R_{a_{err}} = \left| \frac{R_{a\_est} - R_{a\_nom}}{R_{a\_nom}} \right| \quad [6]$$

$$K_{e\_err} = \left| \frac{K_{e\_est} - K_{e\_nom}}{K_{e\_nom}} \right| \quad [7]$$

Decision block 306 compares the $R_{a\_err}$ and the $K_{e\_err}$ to a first error threshold, $K_{p\_err1}$. A "1" indicates that either the Ra_err or the $K_{e\_err}$ is at least the $K_{p\_err1}$, and the flowchart 900 proceeds to decision block 310. A "0" indicates that both the $R_{a\_err}$ and the $K_{e\_err}$ are less than the $K_{p\_err1}$, and the flowchart 900 reverts back to first starting point A 301.

Based on the comparison in decision block 306, when one of the motor armature resistance error and the motor back-emf constant error is at least the first error threshold, decision block 310 compares the $R_{a\_err}$ and the $K_{e\_err}$ to a second error threshold, $K_{p\_err2}$. A "1" indicates that both the $R_{a\_err}$ and the $K_{e\_err}$ are less than the $K_{p\_err2}$, and the flowchart proceeds to block 312. A "0" indicates that at least one of the $R_{a\_err}$ and the $K_{e\_err}$ are at least the $K_{p\_err2}$, and the flowchart proceeds to block 314. Block 312 sets a bias, $flag_1$=1, thereby setting the bias to flagged and assigning a detected bias. Block 314 sets the bias, $flag_1$=0, thereby setting the bias to un-flagged and assigning an un-detected bias. In other words, a detected bias is assigned when one of the motor armature resistance error and the motor back-emf constant error is less than the second error threshold and an un-detected bias is assigned when one of the motor armature resistance error and the motor back-emf constant error is at least the second error threshold. Both blocks 312 and 314 proceed to a second starting point B 316 before proceeding to decision block 318.

Decision block 318 monitors the assigned pressure sensor bias fault trigger, the assigned SOH fault trigger, the assigned bias and the current ratio $I_r$ (e.g., EQ. [5]) and compares the $I_r$ to a current ratio threshold, $I_{th2}$, to determine if a non-trigger condition is satisfied as follows.

$$P_{f\_trig\_flag}=0 \;\&$$

$$SOH_{f\_trig\_flag}=0 \;\&$$

$$flag_1=0, \text{ or}$$

$$I_r \leq I_{th2} \;\&$$

$$SOH_{f\_trig\_flag}=0$$

wherein $I_{th2}$ is a current ratio threshold.

A "1" indicates the non-trigger condition is satisfied when $P_{f\_trig\_flag}=0$, $SOH_{f\_trig\_flag}=0$ and flag)=0; or $I_r \leq I_{th2}$ and $SOH_{f\_trig\_flag}=0$, and the flowchart 900 reverts back to starting point A 301 thereby designating the $E_{f\_trig\_flag}$ as un-flagged and assigning an un-detected $E_{f\_trig\_flag}$. A "0" indicates the non-trigger condition is not satisfied because at least one of the comparisons is not satisfied and the flowchart 900 proceeds to decision block 322. In other words, the flowchart proceeds to decision block 322 (i.e., the non-trigger condition is not satisfied) when any one of the assigned pressure sensor bias fault trigger is detected, the assigned SOH fault trigger is detected and the assigned bias is not detected; or any one of the current ratio is greater than the current ratio threshold and the SOH fault trigger is detected.

Decision block 322 monitors the assigned pressure sensor bias fault trigger, the assigned SOH fault trigger, the assigned bias and the current ratio and compares the current ratio to the current ratio threshold as follows.

$$I_r > I_{th2} \;\&$$

$$SOH_{f\_trig\_flag}=1, \text{ or}$$

$$SOH_{f\_trig\_flag}=1 \;\&$$

$$flag_1=1$$

A "1" indicates the $I_r > I_{th2}$ and $SOH_{f\_trig\_flag}=1$; or $flag_1=1$ and $SOH_{f\_trig\_flag}=1$, and the flowchart 900 proceeds to block 326. A "0" indicates at least one of the comparisons is not satisfied, and the flowchart proceeds to block 324. Block 326 sets the $E_{f\_trig\_flag}=1$, thereby designating the $E_{f\_trig\_flag}$ as flagged and assigning a detected $E_{f\_trig\_flag}$. Block 324 sets the $E_{f\_trig\_flag}=0$, thereby designating the $E_{f\_trig\_flag}$ as un-flagged and assigning an un-detected $E_{f\_trig\_flag}$. In other words, a detected fault trigger ($E_{f\_trig\_flag}=1$) is assigned when the assigned SOH fault trigger is detected (e.g., $SOH_{f\_trig\_flag}=1$ as determined in FIG. 4) and one of the current ratio is greater than the current ratio threshold and the assigned bias is detected ($flag_1=1$). An undetected fault trigger ($E_{f\_trig\_flag}=1$) is assigned when at least one, any one of the current ratio is not greater than the current ratio threshold and the assigned SOH fault trigger is not detected (e.g., $SOH_{f\_trig\_flag}=0$ as determined in FIG. 4) and any one of the assigned bias is not detected ($flag_1=0$) and the SOH fault trigger is not detected ($SOH_{f\_trig\_flag}=0$). It will be appreciated that $E_{f\_trig\_flag}=1$ or $E_{f\_trig\_flag}=0$ corresponds to the electric fault trigger, $E_{f\_trig\_flag}$ 142, output from the fault triggers box 130 and input to the fault isolation box 150.

Figure 7:
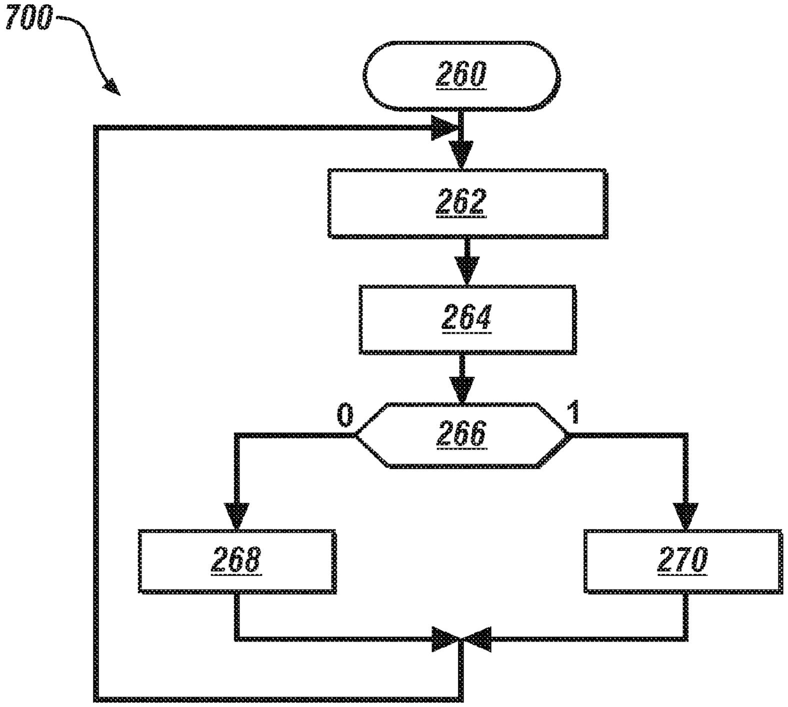

Referring to FIG. 7, a flowchart 700 is illustrated to assign the fuel blockage fault trigger, $Fblock_{f\_trig\_flag}$ 136, as one of detected (e.g., flagged) and un-detected (e.g., un-flagged) in accordance with an exemplary embodiment of the present disclosure. Table 6 is provided as a key to FIG. 7 wherein the numerically labeled blocks and the corresponding functions for the flowchart 700 are set forth as follows.

TABLE 6

| BLOCK | BLOCK CONTENTS |
| --- | --- |
| 260 | Start |
| 262 | Inputs: $P_s$, $P_{des}$, $E_{f\_trig\_flag}$ |
| 264 | $P_r = P_s/P_{des}$ |
| 266 | Is $P_r < P_{r\_low}$ & $E_{f\_trig\_flag} = 0$? |
| 268 | Set $Fblock_{f\_trig\_flag} = 0$ |
| 270 | Set $Fblock_{f\_trig\_flag} = 1$ |

The flowchart 700 starts at block 260 and proceeds to block 262 where $P_s$, $P_{des}$ and $E_{f\_trig\_flag}$ (e.g., see FIG. 9) are input at block 262, and then the flowchart 700 proceeds to block 264 where the pressure ratio, $P_r$, is determined utilizing Eq [4]. Decision block 266 compares the $P_r$ to the low pressure ratio threshold, $P_{r\_low}$. A "0" indicates that at least one of the $P_r$ is not less than the $P_{r\_low}$ and the $E_{f\_trig\_flag}$ is not equal to zero, and the flowchart 700 proceeds to block 268. Block 268 sets the $Fblock_{f\_trig\_flag}=0$, thereby designating the $Fblock_{f\_trig\_flag}$ as un-flagged and assigning an un-detected $Fblock_{f\_trig\_flag}$. Block 270 sets the $Fblock_{f\_trig\_flag}=1$, thereby designating the $Fblock_{f\_trig\_flag}$ as flagged and assigning a detected $Fblock_{f\_trig\_flag}$. In other words a detected fuel blockage fault trigger (i.e., $Fblock_{f\_trig\_flag}=1$) is assigned when the pressure ratio is less than the low pressure ratio threshold and the assigned electric fault trigger is un-detected (i.e., $E_{f\_trig\_flag}=0$ as determined in FIG. 9). An un-detected fuel blockage fault trigger ($Fblock_{f\_trig\_flag}=0$) is assigned when one of the pressure ratio is at least the low pressure ratio threshold and the assigned electric fault trigger is detected (i.e., $E_{f\_trig\_flag}=1$ as determined in FIG. 9). It will be appreciated that $Fblock_{f\_trig\_flag}=1$ or $Fblock_{f\_trig\_flag}=0$ corresponds to the fuel blockage fault trigger, $Fblock_{f\_trig\_flag}$ 136, output from the fault triggers box 130 and input to the fault isolation box 150.

The fault isolation block 150 of FIG. 3, isolates the actual fault 160 in the fuel delivery system amongst a plurality of possible faults when a condition respective to one of the possible faults is satisfied based on at least one of the plurality of fault triggers 132, 134, 136, 138, 140 and 142 designated as one of flagged (e.g., detected) and un-flagged (un-detected). Due to the closed loop nature of the exemplary fuel delivery system 20, an actual fault in the fuel delivery system can generate a plurality of possible faults including fictitious faults within the fuel delivery system 20. The fault isolation block 150 includes individually analyzing each of the plurality of possible faults where each possible fault analyzed has a lower degree of severity than an immediately preceding possible fault analyzed. In other words the plurality of possible faults are arranged to be analyzed in a hierarchy from the highest degree of severity to the lowest degree of severity. Each possible fault is associated with a respective fault condition analyzed as one of satisfied and un-satisfied based on at least one of the assigned and designated plurality of fault triggers. Further described in FIG. 10 below, a currently analyzed possible fault is isolated as the actual fault 160 when the respective fault condition associated with the currently analyzed possible fault is satisfied. When the respective fault condition associated with the currently analyzed possible fault is not satisfied, a subsequent possible fault having a lower degree of severity than the currently analyzed possible fault is proceeded to be analyzed.

Figure 10:
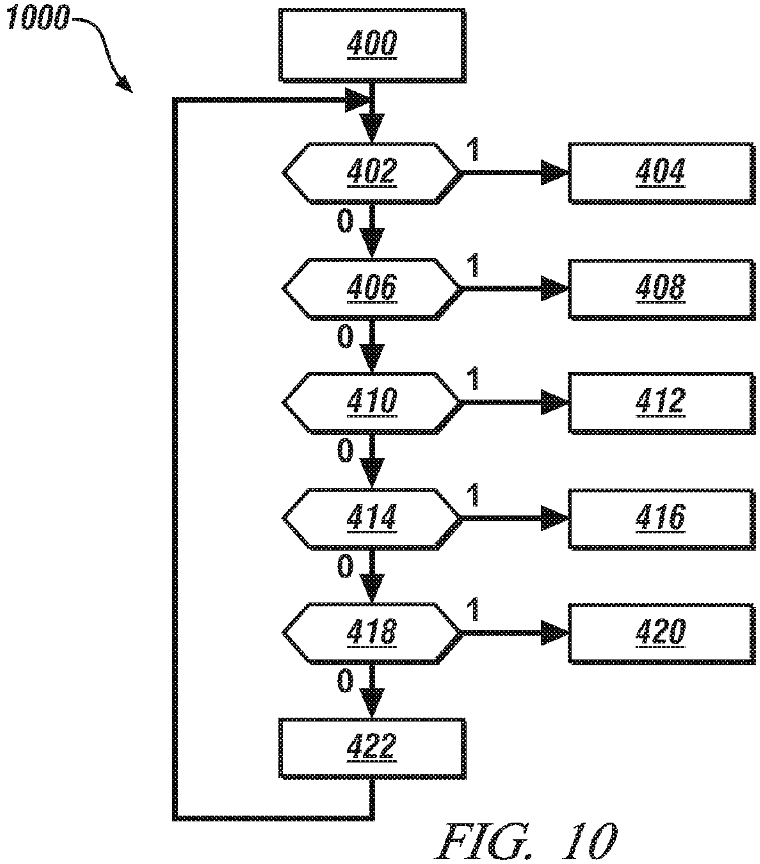
FIG. 10 illustrates a flowchart associated with a fault isolation block of the fault isolation controller of FIG. 3 for isolating the actual fault, in the ERFS in accordance with the present disclosure.

Referring to FIG. 10, the flowchart 1000 is illustrated to detect the actual fault 160 as one of an electrical fault, a fuel leak fault, a fuel blockage fault, a current sensor bias fault, and a pressure sensor bias fault. In a non-limiting embodiment, the electrical fault has a higher degree of severity than the fuel leak fault, the fuel leak fault has a higher degree of severity than the fuel blockage fault, and the current sensor bias fault has a higher degree of severity than the pressure sensor bias fault. Table 7 is provided as a key to FIG. 10 wherein the numerically labeled blocks and the corresponding functions for the flowchart 1000 are set forth as follows.

TABLE 7

| BLOCK | BLOCK CONTENTS |
|---|---|
| 400 | Initialization |
| 402 | Condition $C_E$ |
| 404 | Electrical fault detected |
| 406 | Condition $C_L$ |
| 408 | Fuel leak detected |
| 410 | Condition $C_B$ |
| 412 | Fuel Blockage detected |
| 414 | Condition $C_I$ |
| 416 | Current sensor bias detected |
| 418 | Condition $C_P$ |
| 420 | Pressure sensor bias detected |
| 422 | Normal operation |

At block 400, the fault isolation block 150 of FIG. 3 is initialized and proceeds when the status is equal to normal operation where no faults have previously been detected. Decision block 402 corresponds to an electrical fault condition (Condition $C_E$) respective to a possible electrical fault and includes monitoring the designated electrical fault trigger ($E_{f\_trig\_flag}$ 142), the potential current sensor bias ($I_{b\_flag}$ 129), the designated pump speed fault trigger ($\omega_{nf\_trig\_flag}$ 140) and the designated pressure sensor bias fault trigger ($P_{f\_trig\_flag}$ 134). Based on the monitoring, decision block 402 determines through analyzing whether or not the Condition $C_E$ is satisfied or unsatisfied (e.g., true or false). Condition $C_E$ is satisfied when the following relationships are satisfied.

$$E_{f\_trig\_flag}=1,$$

$$I_{b\_flag}=0,$$

$$\omega_{nf\_trig\_flag}=1, \text{ and}$$

$$P_{f\_trig\_flag}=0 \text{ OK}$$

A "1" indicates that the Condition $C_E$ is satisfied (i.e., all the above relationships are satisfied), and the flowchart 1000 proceeds to block 404 where it is determined that the electrical fault is isolated as the actual fault 160. In other words the electrical fault is isolated as the actual fault 160 amongst the plurality of possible faults when the designated electrical fault trigger is flagged the potential current sensor bias is not detected, the designated pump speed fault trigger is flagged and the designated pressure sensor bias fault trigger is un-flagged. A "0" indicates that the Condition $C_E$ is un-satisfied (i.e., at least one of the above relationships is not satisfied), and the flowchart proceeds to decision block 406. Therefore, when the analyzed electrical fault condition (Condition $C_E$) is un-satisfied, the flowchart 1000 proceeds to decision block 406 to analyze a possible fuel leak fault associated with a respective fuel leak fault condition (Condition $C_L$) analyzed as one of satisfied and un-satisfied.

Decision block 406 corresponds to the fuel leak fault condition (Condition $C_L$) respective to the possible fuel leak fault and includes monitoring the designated pressure sensor bias fault trigger ($P_{f\_trig\_flag}$ 134), the designated fuel system SOH fault trigger ($SOH_{f\_trig\_flag}$ 132), the designated pressure ratio fault trigger ($P_{ratio\_trig\_flag}$ 138) and the electric fault condition of decision block 402. Based on the monitoring, decision block 406 determines through analyzing whether or not the Condition $C_L$ is satisfied or unsatisfied (e.g., true or false). Condition $C_L$ is satisfied when the following relationships are satisfied.

$$P_{f\_trig\_flag}=1,$$

$$SOH_{f\_trig\_flag}=0,$$

$$P_{ratio\_trig\_flag}=1, \text{ and}$$

$$C_E=\text{False}$$

A "1" indicates that the Condition $C_L$ is satisfied (i.e., all the above relationships are satisfied), and the flowchart 1000 proceeds to block 408 where it is determined that the fuel leak is isolated as the actual fault 160. In other words, the fuel leak fault is isolated as the actual fault 160 amongst the plurality of possible faults when the designated pressure sensor bias fault trigger is flagged, the designated fuel system SOH fault trigger is un-flagged, the designated pressure ratio fault trigger is flagged and the electrical fault condition is not satisfied. A "0" indicates that the Condition $C_L$ is un-satisfied (i.e., at least one of the above relationships is not satisfied), and the flowchart proceeds to decision block 410. Therefore, when the analyzed fuel leak fault condition (Condition $C_L$) is un-satisfied, the flowchart proceeds to decision block 410 to analyze a possible fuel blockage fault associated with a respective fuel blockage fault condition (Condition $C_B$) analyzed as one of satisfied and un-satisfied.

Decision block 410 corresponds to the fuel blockage fault condition (Condition $C_B$) respective to a possible fuel blockage fault and includes monitoring the designated pressure sensor bias fault trigger ($P_{f\_trig\_flag}$ 134), the designated fuel blockage fault trigger ($Fblock_{f\_trig\_flag}$ 136), the electrical fault condition and the fuel leak fault condition. Based on the monitoring, decision block 410 determines through analyzing whether or not the Condition $C_B$ is satisfied or unsatisfied (e.g., true or false). Condition $C_B$ is satisfied when the following relationships are satisfied.

$$P_{f\_trig\_flag}=1,$$

$$Fblock_{f\_trig\_flag}=1,$$

$$C_E=\text{False, and}$$

$$C_L=\text{False}$$

A "1" indicates that the Condition $C_B$ is true (i.e., all the above relationships are satisfied), and the flowchart 1000 proceeds to block 412 where it is determined that the fuel blockage fault is isolated as the actual fault 160. In other words, the fuel blockage fault is isolated as the actual fault 160 amongst the plurality of possible faults when the designated pressure sensor bias fault trigger is flagged, the fuel blockage fault trigger is flagged, the electrical fault condition is un-satisfied and the fuel leakage fault condition is un-satisfied. A "0" indicates that the Condition $C_B$ is un-satisfied (i.e., at least one of the above relationships is not satisfied), and the flowchart proceeds to decision block 414. Therefore, when the analyzed fuel blockage fault condition (Condition $C_B$) is un-satisfied, the flowchart 1000 proceeds to decision block 414 to analyze a possible current sensor bias fault associated with a respective current sensor fault bias condition (Condition $C_1$) analyzed as one of satisfied and un-satisfied.

Decision block 414 corresponds to the current sensor fault bias condition (Condition $C_1$) respective to a possible current sensor bias fault and includes monitoring the potential current sensor bias ($I_{b\_flag}$ 129), the designated fuel system SOH fault trigger ($SOH_{f\_trig\_flag}$ 132), the electrical fault condition, the fuel leak fault condition and the fuel blockage fault condition. Based on the monitoring, decision block 414 determines through analyzing whether or not the Condition $C_1$ is satisfied or unsatisfied (e.g., true or false). Condition $C_1$ is satisfied when the following relationships are satisfied.

$I_{b\_flag}=1$, $SOH_{f\_trig\_flag}=1$, $C_E$=False, $CL$=False, and $CB$=False

A "1" indicates that the Condition $C_I$ is satisfied (i.e., all the above relationships are satisfied), and the flowchart 1000 proceeds to block 416 where it is determined that the current sensor bias fault is isolated as the actual fault 160. In other words, the current sensor bias fault is isolated as the actual fault 160 amongst the plurality of possible faults when the potential current sensor bias is detected, the designated fuel system SOH fault trigger is flagged, the electrical fault condition is not satisfied, the fuel leak fault condition is not satisfied and the fuel blockage fault condition is not satisfied. A "0" indicates that the Condition $C_I$ is un-satisfied (i.e., at least one of the above relationships is not satisfied), and the flowchart proceeds to decision block 418. Therefore when the analyzed current sensor bias fault condition (Condition $C_I$) is un-satisfied, the flowchart 1000 proceeds to decision block 418 to analyze a possible pressure sensor bias fault associated with a respective pressure sensor bias fault condition (Condition $C_P$) analyzed as one of satisfied and un-satisfied.

Decision block 418 corresponds to the pressure sensor bias fault condition (Condition $C_P$) respective to the possible pressure sensor bias fault and includes monitoring the designated pressure sensor bias fault trigger, the designated pressure ratio fault trigger, the designated fuel system SOH fault trigger, the potential current sensor bias, the electrical fault condition, the fuel leak fault condition, the fuel blockage fault condition and the current sensor bias fault condition. Based on the monitoring, decision block 418 determines through analyzing whether or not the Condition Cp is satisfied or unsatisfied (e.g., true or false). Condition Cp is satisfied when the following relationships are satisfied.

$P_{f\_trig\_flag}=1$, $P_{ratio\_trig\_flag}=0$, $C_E$=False, $C_L$=False, $C_B$=False, $C_I$=False, $I_{b\_flag}=0$, and $SOH_{f\_trig\_flag}=1$ A "1" indicates that the Condition $C_P$ is satisfied (i.e., all the above relationships are satisfied), and the flowchart 1000 proceeds to block 420 where it is determined that the Pressure sensor bias fault is isolated as the actual fault 160. In other words, the pressure sensor bias fault is isolated as the actual fault 160 amongst the plurality of possible faults when the designated pressure sensor bias fault trigger is flagged, the designated pressure ratio fault trigger is un-flagged, the designated fuel system SOH fault trigger is flagged, the potential current sensor bias is not detected, the electrical fault condition is not satisfied, the fuel leak fault condition is no satisfied, the fuel blockage fault condition is not satisfied and the current sensor bias fault condition is not satisfied. A "0" indicates that the Condition $C_P$ is un-satisfied (i.e., at least one of the above relationships is not satisfied), and the flowchart proceeds to block 422 and then reverts back to decision block 402. Therefore, when the analyzed pressure sensor bias fault (Condition $C_P$) is un-satisfied, the flowchart 1000 proceeds to block 422 and then reverts back to decision block 402 to re-analyze a possible electrical fault associated with the respective electrical fault condition (Condition $C_E$). Hence, if Condition CP is un-satisfied no actual faults are determined or isolated, and the fuel delivery system is determined to be operating without any faults.

Referring back to FIG. 3, when the actual fault 160 is detected and isolated, the actual fault 160 is input to the DTC module 160, where the DTC module 160 can decipher the actual fault 160 and notify the operator of the vehicle of the actual fault. For instance, the DTC module 160 can execute a control action in response to the isolated actual fault in the fuel delivery system including at least one of recording a diagnostic trouble code corresponding to the isolated actual fault and displaying a message corresponding to the isolated actual fault. In a non limiting example, displaying the message can include displaying via an instrument panel, a dashboard, a Human Machine Interface (HMI) or sounding an alarm within the vehicle. Similarly, the DTC module 170 can notify the operator to immediately take the vehicle in for service.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed:

1. Method for detecting and isolating an actual fault in a fuel delivery system having a fuel pump and a fuel pump motor, comprising:

monitoring fuel pressure, pump current, and pump voltage;

designating each of a plurality of fault triggers as one of flagged and un-flagged based on at least one of the fuel pressure, the pump current and the pump voltage;

analyzing each of a plurality of possible faults associated with a respective fault condition; and isolating a corresponding one of the plurality of possible faults as the actual fault in the fuel delivery system when a condition respective to the corresponding possible fault is satisfied based on at least one of the plurality of fault triggers designated as one of flagged and un-flagged.

2. The method of claim 1 further comprising:

determining a fuel system state of health (SOH), an estimated pump speed, an estimated motor armature resistance, an estimated motor back-emf constant, a current sensor modeled pump current, a potential pressure sensor bias and a potential current sensor bias based on at least one of the monitored fuel pressure, the pump current and the pump voltage;

wherein the plurality of fault triggers comprise:

a fuel system SOH fault trigger based on the fuel system SOH;

a pressure sensor bias fault trigger based on the fuel pressure, a desired fuel pressure, the current sensor modeled pump current, the pump current and the estimated motor armature resistance;

a pressure ratio fault trigger based on the fuel pressure and the desired fuel pressure;

a pump speed fault trigger based on the fuel pressure and the estimated pump speed;

an electric fault trigger based on the pump current, the current sensor modeled pump current, the estimated motor armature resistance, a nominal motor armature resistance, the estimated motor back-emf constant, a nominal motor back-emf constant, the pressure ratio fault trigger and the fuel system SOH fault trigger; and a fuel blockage fault trigger based on the fuel pressure, the desired fuel pressure and the electric fault trigger.

3. The method of claim 2 wherein isolating the corresponding one of the plurality of possible faults as the actual fault comprises:

monitoring an electrical fault condition respective to a possible electrical fault comprising monitoring the electrical fault trigger, the potential current sensor bias, the pump speed fault trigger and the pressure sensor bias fault trigger; and isolating the electrical fault as the actual fault from the plurality of possible faults when the electrical fault trigger is flagged, the potential current sensor bias is not detected, the pump speed fault trigger is flagged and the pressure sensor bias fault trigger is un-flagged.

4. The method of claim 2 wherein isolating the corresponding one of the plurality of possible faults as the actual fault comprises:

monitoring a fuel leak fault condition respective to a possible fuel leak fault comprising monitoring the pressure sensor bias fault trigger, the fuel system SOH fault trigger and the pressure ratio fault trigger; and isolating the fuel leak fault as the actual fault from the plurality of possible faults when the pressure sensor bias fault trigger is flagged, the fuel system SOH fault trigger is un-flagged and the pressure ratio fault trigger is flagged.

5. The method of claim 2 wherein isolating the corresponding one of the plurality of possible faults as the actual fault comprises:

monitoring a fuel blockage condition respective to a possible fuel blockage fault comprising monitoring the pressure sensor bias fault trigger and the fuel blockage fault trigger; and isolating the fuel blockage fault as the actual fault from the plurality of possible faults when the pressure sensor bias fault trigger is flagged and the fuel blockage fault trigger is flagged.

6. The method of claim 2 wherein isolating the corresponding one of the plurality of possible faults as the actual fault comprises:

monitoring a current sensor bias condition respective to a possible current sensor bias fault comprising monitoring the potential current sensor bias and the fuel system SOH fault trigger; and isolating the current sensor bias fault as the actual fault from the plurality of possible faults when the potential current sensor bias is detected and the fuel system SOH fault trigger is flagged.

7. The method of claim 2 wherein isolating the corresponding one of the plurality of possible faults as the actual fault comprises:

monitoring a pressure sensor bias condition respective to a possible pressure sensor bias fault comprising monitoring the pressure sensor bias fault trigger, the pressure ratio fault trigger, the fuel system SOH fault trigger and the potential current sensor bias; and isolating the pressure sensor bias fault as the actual fault from the plurality of possible faults when the pressure sensor bias fault trigger is flagged, the pressure ratio fault trigger is un-flagged, the fuel system SOH fault trigger is flagged and the potential current sensor bias is not detected.

8. The method of claim 1 further comprising:

executing a control action in response to the isolated actual fault in the fuel delivery system comprising at least one of recording a diagnostic trouble code corresponding to the isolated actual fault, and displaying a message corresponding to the isolated actual fault.

9. The method of claim 1 wherein the fuel delivery system comprises an electronic returnless fuel system.

10. Method for isolating an actual fault in a fuel delivery system having a fuel pump and a fuel pump motor, comprising:

monitoring fuel pump operating parameters;

assigning each of a plurality of fault triggers as one of detected and un-detected based on the monitored fuel pump operating parameters;

individually analyzing each of a plurality of possible faults where each possible fault analyzed has a lower degree of severity than an immediately preceding possible fault analyzed, each possible fault associated with a respective fault condition analyzed as one of satisfied and un-satisfied based on at least one of the assigned plurality of fault triggers;

isolating a currently analyzed possible fault as the actual fault when the respective fault condition associated with the currently analyzed possible fault is satisfied; and proceeding to analyze a subsequent possible fault having a lower degree of severity than the currently analyzed possible fault when the respective fault condition associated with the currently analyzed possible fault is not satisfied.

11. The method of claim 10 wherein individually analyzing each of the plurality of possible faults comprises:

analyzing a possible electrical fault associated with a respective electrical fault condition analyzed as one of satisfied and un-satisfied;

when the analyzed electrical fault condition is un-satisfied, analyzing a possible fuel leak fault associated with a respective fuel leak fault condition analyzed as one of satisfied and un-satisfied;

when the analyzed fuel leak fault condition is un-satisfied, analyzing a possible fuel blockage fault associated with a respective fuel blockage fault condition analyzed as one of satisfied and un-satisfied;

when the analyzed fuel blockage fault condition is un-satisfied, analyzing a possible current sensor bias fault associated with a respective current sensor bias fault condition analyzed as one of satisfied and un-satisfied; and when the analyzed current sensor bias fault condition is un-satisfied, analyzing a possible pressure sensor bias fault associated with a respective pressure sensor bias fault condition analyzed as one of satisfied and un-satisfied.

12. The method of claim 10 wherein assigning each of a plurality of fault triggers as one of detected and un-detected based on the monitored fuel pump operating parameters comprises:

monitoring a fuel system state of health (SOH);

comparing the fuel system SOH to a low SOH threshold;

assigning a detected fuel system SOH fault trigger when the fuel system SOH is less than the low state of health threshold; and assigning an un-detected fuel system SOH fault trigger when the fuel system SOH is not less than the low state of health threshold.

13. The method of claim 10 wherein assigning each of a plurality of fault triggers as one of detected and un-detected based on the monitored fuel pump operating parameters comprises:

monitoring a pressure ratio, a current ratio and an estimated motor armature resistance;

comparing the pressure ratio to a low pressure ratio threshold, the estimated motor armature resistance to a motor armature resistance threshold and the current ratio to a maximum current ratio threshold;

when the pressure ratio is not greater than the low pressure ratio threshold, the estimated motor armature resistance is not greater than the motor armature resistance threshold and the current ratio is at least the maximum current ratio threshold, comparing the pressure ratio to a minimum pressure ratio threshold;

assigning a detected pressure sensor bias fault trigger when the pressure ratio is not greater than the minimum pressure ratio threshold; and assigning an un-detected pressure sensor bias fault trigger when the pressure ratio is greater than the minimum pressure ratio threshold.

14. The method of claim 10 wherein assigning each of a plurality of fault triggers as one of detected and un-detected based on the monitored fuel pump operating parameters comprises:

monitoring a pressure ratio;

comparing the pressure ratio to a low pressure ratio threshold;

when the pressure ratio is not greater than the low pressure ratio threshold, comparing the pressure ratio to a minimum pressure ratio threshold;

assigning a detected pressure ratio fault trigger when the pressure ratio is less than the minimum pressure ratio threshold; and assigning an un-detected pressure ratio fault trigger when the pressure ratio is not less than the minimum pressure ratio threshold.

15. The method of claim 10 wherein assigning each of a plurality of fault triggers as one of detected and un-detected based on the monitored fuel pump operating parameters comprises:

monitoring a pressure ratio and an assigned electric fault trigger;

comparing the pressure ratio to a low pressure ratio threshold;

assigning a detected fuel blockage fault trigger when the pressure ratio is less than the low pressure ratio threshold and the assigned electric fault trigger is un-detected; and assigning an un-detected fuel blockage fault trigger when one of the pressure ratio is not less than the low pressure ratio threshold and the assigned electric fault trigger is detected.

16. The method of claim 10 wherein assigning each of a plurality of fault triggers as one of detected and un-detected based on the monitored fuel pump operating parameters comprises:

monitoring a fuel pressure and an estimated pump speed;

comparing the fuel pressure to a first fuel pressure threshold and the estimated pump speed to a first pump speed threshold;

when both the fuel pressure is less than the first fuel pressure threshold and the estimated pump speed is at least the first pump speed threshold, comparing the fuel pressure to a second fuel pressure threshold and the estimated pump speed to a second pump speed threshold;

assigning a detected pump speed fault trigger when any one of the fuel pressure is not greater than the second fuel pressure threshold and the estimated pump speed is not less than the second pump speed threshold; and assigning an un-detected pump speed fault trigger when both the fuel pressure is greater than the second fuel pressure threshold and the estimated pump speed is less than the second pump speed threshold.

17. The method of claim 10 wherein assigning each of a plurality of fault triggers as one of detected and un-detected based on the monitored fuel pump operating parameters comprises:

monitoring a motor armature resistance error and a motor back-emf constant error;

comparing the motor armature resistance error and the motor back-emf constant error to a first error threshold;

when one of the motor armature resistance error and the motor back-emf constant error is at least the first error threshold, comparing the motor armature resistance error and the motor back EMF constant error to a second error threshold, and assigning a detected bias when one of the motor armature resistance error and the motor back-emf constant error is less than the second error threshold, and assigning an un-detected bias when one of the motor armature resistance error and the motor back-emf constant error is not less than the second error threshold;

monitoring an assigned pressure sensor bias fault trigger, an assigned SOH fault trigger, the assigned bias and a current ratio;

comparing the current ratio to a current ratio threshold;

determining a non-trigger condition is not satisfied when one of, any one of the assigned pressure fault trigger is detected, the assigned SOH fault trigger is detected and the assigned bias is not detected, and any one of the current ratio is greater than the current ratio threshold and the SOH fault trigger is detected;

assigning a detected electrical fault trigger when the assigned SOH fault trigger is detected and one of the current ratio is greater than the current ratio threshold and the assigned bias is detected; and assigning an undetected electrical fault trigger when at least one of, any one of the current ratio is not greater than the current ratio threshold and the assigned SOH fault trigger is not detected, and at least one of the assigned bias is not detected and the SOH fault trigger is not detected.

18. The method of claim 10 further comprising:

executing a control action in response to the isolated actual fault in the fuel delivery system comprising at least one of, recording a diagnostic trouble code corresponding to the isolated actual fault, and displaying a message corresponding to the isolated actual fault.

19. The method of claim 10 wherein the fuel delivery system is an electronic returnless fuel system.

20. Apparatus for detecting and isolating an actual fault in a fuel delivery system having a fuel pump and a fuel pump motor, comprising:

an internal combustion engine; and an electronic returnless fuel delivery system comprising:

a fuel tank, a fuel pump positioned within the fuel tank and supplying fuel from the fuel tank to the engine, and a controller in communication with the fuel pump and configured to:

monitor fuel pressure, pump current, pump voltage and a desired fuel pressure, designate each of a plurality of fault triggers as one of flagged and un-flagged based on at least one of the fuel pressure, the pump current and the pump voltage, analyze each of a plurality of possible faults associated with a respective fault condition; and isolate a corresponding one of the plurality of possible faults as the actual fault in the fuel delivery system when a condition respective to the corresponding possible fault is satisfied based on at least one of the plurality of fault triggers designated as one of flagged and un-flagged.

* * * * *